April 23, 1968 R. T. ADAMS ET AL 3,380,056
SIMPLIFIED OMEGA RECEIVER UTILIZING PHOTO-RESPONSIVE CORRELATOR
Filed Feb. 17, 1964 5 Sheets-Sheet 1
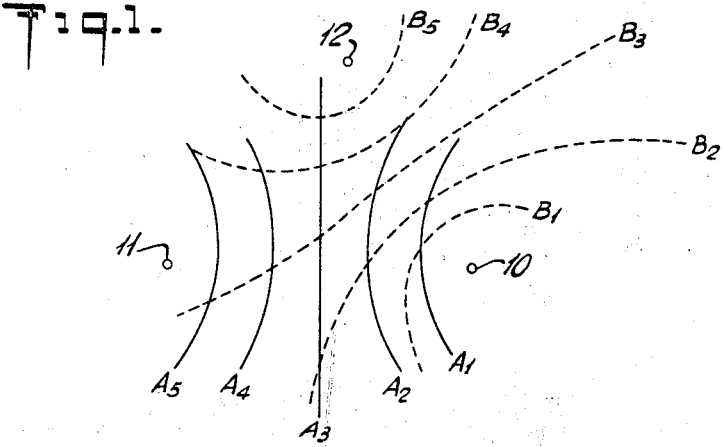
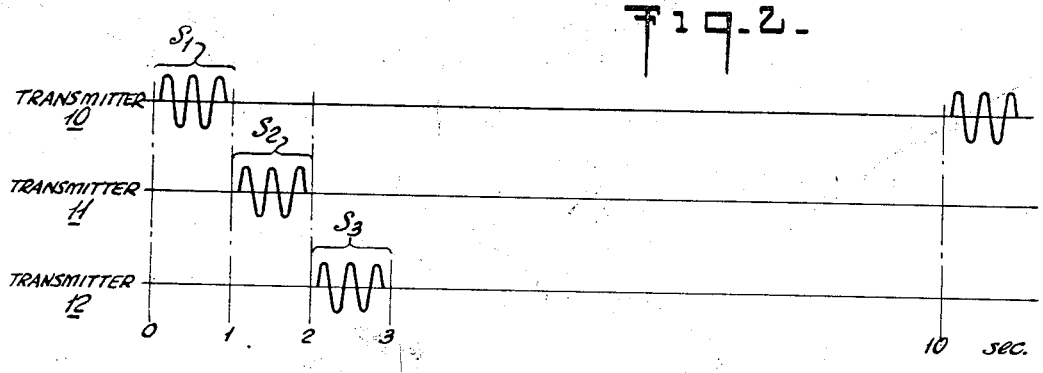
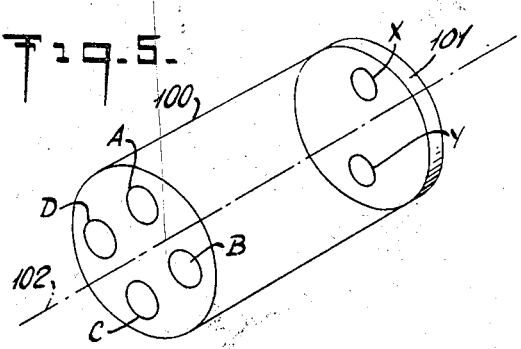
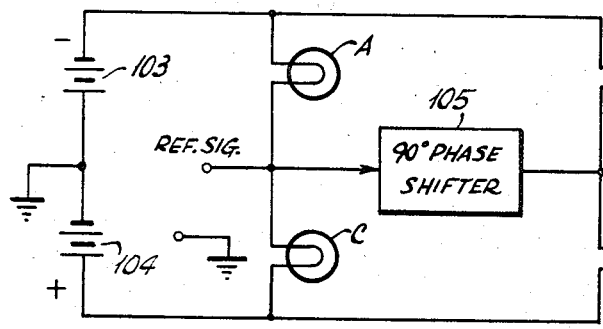
INVENTORS
ROBERT T. ADAMS
RAYMOND O. SCHILDKNECHT
BY
Hopgood & Calimafde
ATTORNEYS

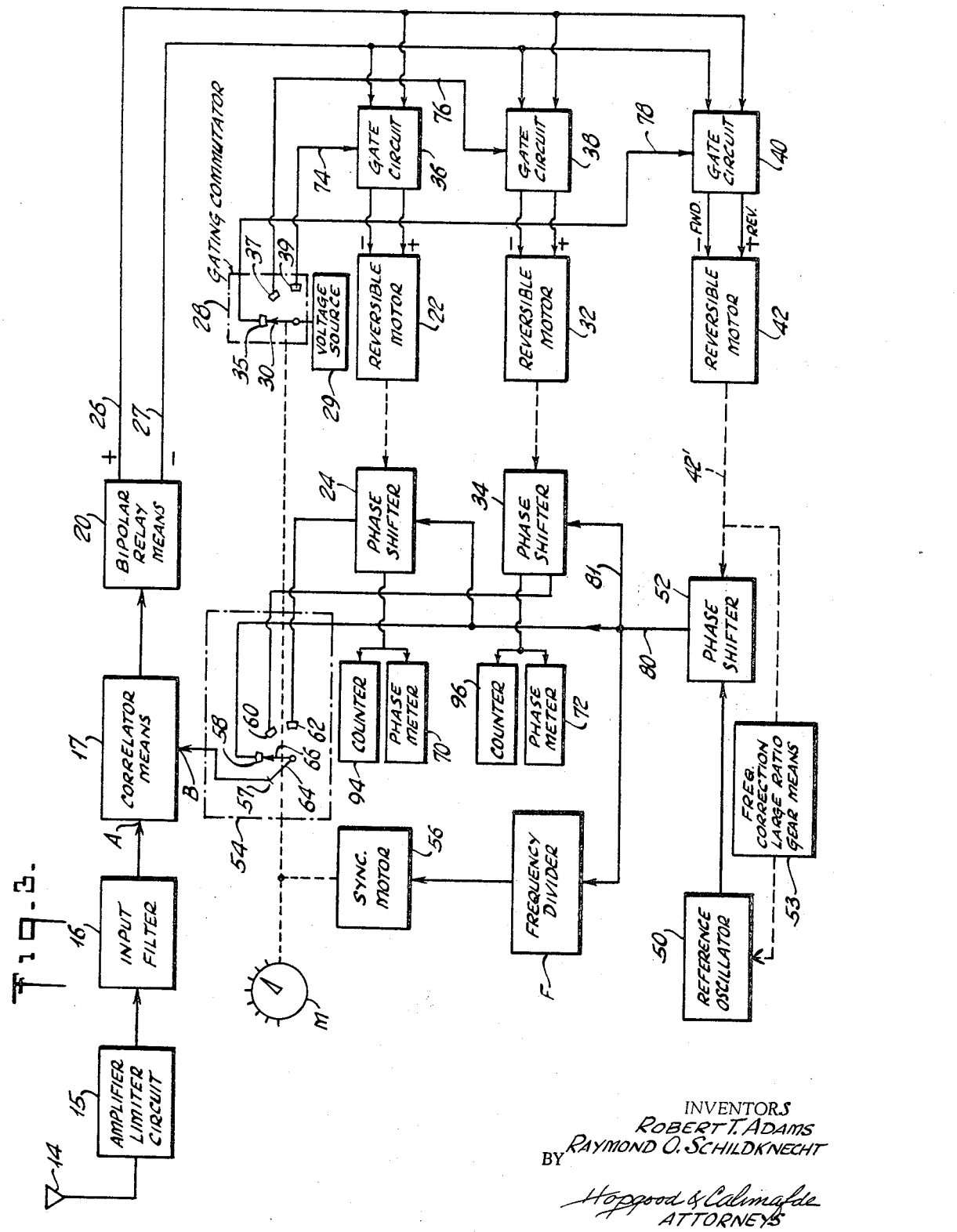

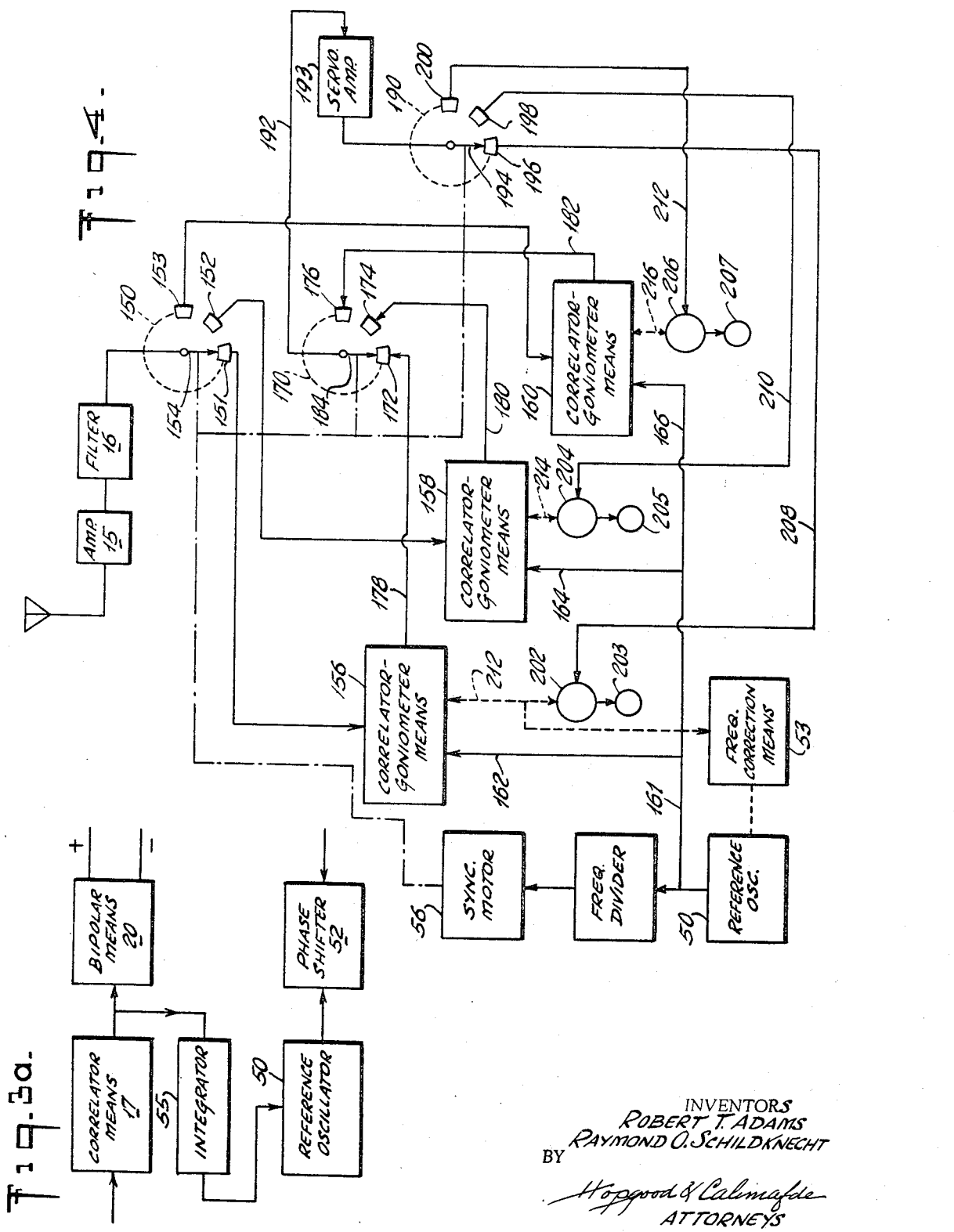

April 23, 1968  R. T. ADAMS ET AL  3,380,056
SIMPLIFIED OMEGA RECEIVER UTILIZING PHOTO-RESPONSIVE CORRELATOR
Filed Feb. 17, 1964  5 Sheets-Sheet 4
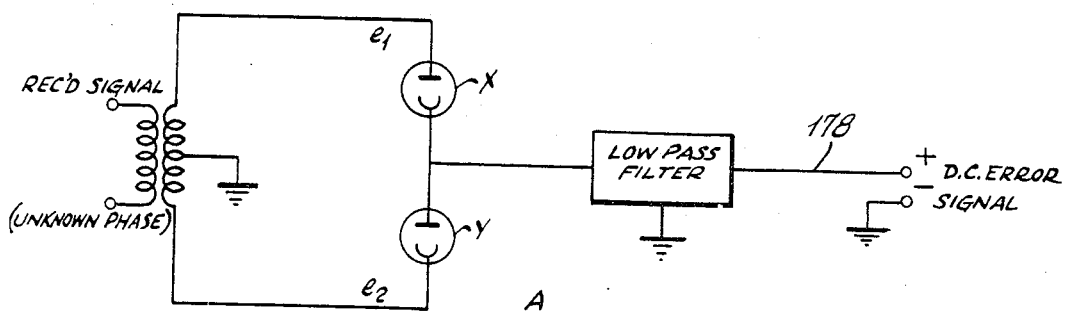
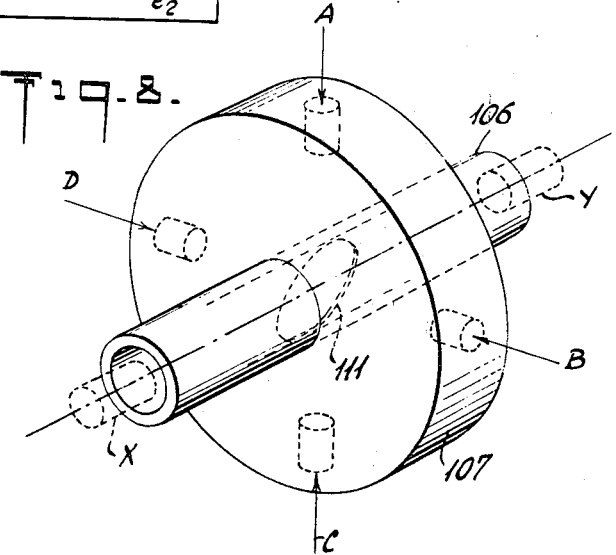
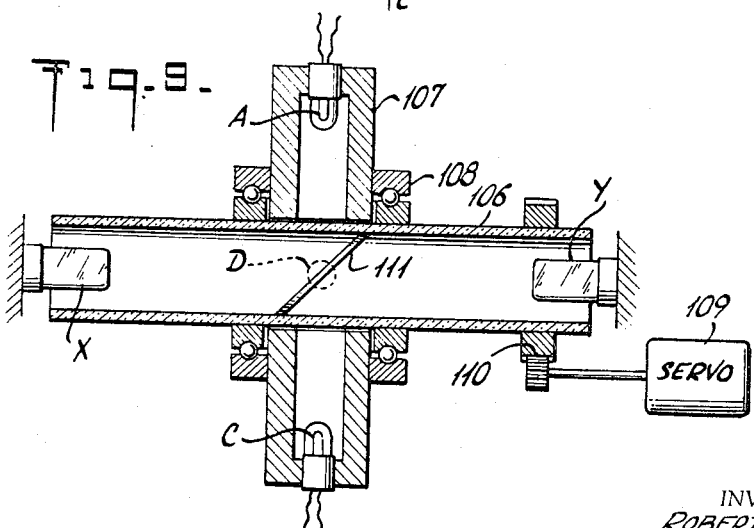
INVENTORS
ROBERT T. ADAMS
BY RAYMOND O. SCHILDKNECHT
Hopgood & Calimafde
ATTORNEYS

United States Patent Office 3,380,056
Patented Apr. 23, 1968

3,380,056
SIMPLIFIED OMEGA RECEIVER UTILIZING
PHOTO-RESPONSIVE CORRELATOR
Robert T. Adams, Short Hills, and Raymond O. Schildknecht, Clifton, N.J., assignors, by mesne assignments, to Communication Systems, Incorporated, Carson City, Nev., a corporation of Nevada
Filed Feb. 17, 1964, Ser. No. 345,304
39 Claims. (Cl. 343—105)

This invention relates to an improved receiver for Omega radio navigation systems.

The Omega system is a pulsed radio navigation system in which a fix is determined by the time difference between the arrival of three or more related signals at a receiver in an aircraft, ship, submarine, or other navigable vehicle. The Omega system is somewhat similar to loran, but Omega operates in the very low frequency range rather than the very high frequency range, and the time difference between the arrival of Omega signals is measured by phase differences rather than by coincidence of pulses.

In the Omega system, three or more signals of equal frequency are transmitted in fixed phase relationship from geographically separated transmitter stations. When these signals are received by an Omega receiver, the phase difference between the received signals depends on the geographical position of the receiver with respect to the transmitting stations. More specifically, the loci of constant phase difference in any two received signals is represented by a family of hyperbolas whose foci coincide with the geographical location of the corresponding transmitter stations. Therefore, the geographical location of the receiver can be established as the intersection of two hyperbolic curves which are determined by the phase difference between the signals received from two pairs of Omega transmitter stations.

The Omega system is desirable because of its extremely long range, which is greater than 7,000 nautical miles. Only six transmitting stations are required to provide coverage over the entire earth with position fixes accurate to one mile or less. The system can be used by surface ships, as well as aircraft and submerged submarines. However, the extent to which the system will be used by a large number of vessels depends upon the cost, accuracy, simplicity and reliability of the receiving apparatus. This requires a receiver which is inexpensive to produce, but does not sacrifice performance or reliability.

Accordingly, an object of this invention is to provide a simple but effective high-performance Omega receiver.

A second object is to provide an Omega receiver having simplified circuitry resulting in considerable reduction in complexity and cost, which will be within the financial means of a relatively small boat owner.

Still another object is to provide a reliable low cost high-performance Omega receiver having optimum apportionment of tasks between the receiver and its operator.

Yet another object of this invention is to provide an improved performance Omega receiver.

A further object of this invention is to provide a novel, and improved correlator.

Also, another object of this invention is to provide a combined balanced-modulator and phase rotator.

Still another object of this invention is to provide a simple combined correlator-goniometer in which multiplication of signals is performed by varying a circuit parameter in accordance with a predetermined varying radiant energy means.

Yet another object of this invention is to provide an Omega receiver system with simple long-term integration capability.

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is a chart drawing showing the positions of three transmitting stations and the resulting hyperbolas representing lines of phase in received signals;

FIG. 2 is a timing diagram illustrating the sequence of signals as transmitted from the three stations shown in FIG. 1;

FIG. 3 is a block diagram of one illustrative Omega receiver of this invention;

FIG. 3a is a block diagram of a modification of the reference frequency control of FIG. 3;

FIG. 4 is a block diagram of an alternate and preferred Omega receiver embodiment in accordance with the invention;

FIG. 5 is a perspective view of one illustrative correlator means of this invention;

FIG. 6 is a schematic circuit diagram of the signal input circuit for the correlator means shown in FIG. 5;

FIG. 7 is a schematic circiut diagram of the signal output circuit for the correlation means shown in FIG. 5;

FIG. 8 is a perspective view of another correlator means of this invention;

FIG. 9 is a sectional view of the correlator means shown in FIG. 8; and

Figure 10:
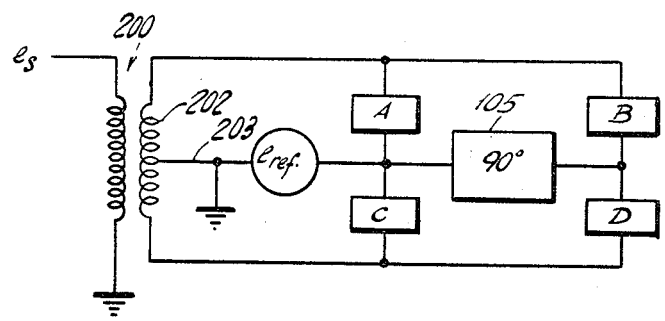
FIGS. 10 and 11 are circuit diagrams similar to FIGS. 6 and 7 illustrating an alternate embodiment of the correlator means of the invention.

In this invention, the preferred transmission frequency is 10.2 kilocycles, although it is understood that other low frequency signals may be utilized. As shown in FIG. 2, a basic cycle of transmission constitutes one signal transmission ($S_1$, $S_2$, $S_3$) in sequence from each transmitter 10, 11, 12. Each signal from the respective transmitters may in turn comprise a plurality of cycles of low frequency energy. If the period of the basic cycle is set at 10 seconds, the signal $S_1$ from transmitter 10 begins at .10 second and has a duration of .80 second. The signal $S_2$ from transmitter 11 begins at 1.10 seconds and is completed at 1.90 seconds. The signal $S_3$ from transmitter 13 begins at 2.10 seconds and is completed at 2.90 seconds. The cycle repeats beginning with transmitter 10 transmitting $S_1$ at 10.10 seconds. If more than three transmitters are used, time slots beginning at 3.10, 4.10 . . . 9.10 seconds are available.

When the received signals $S_1$ and $S_2$ from the transmitters 10 and 11 are compared and suitable time delay corrections are introduced to compensate for the fixed and known time difference between the transmission of the two signals (i.e. 1 sec.), the phase difference between the two signals may be measured to determine a fix on a line of phase (line of position). The hyperbolas $A_1 \ldots A_5$ (FIG. 1) are lines of phase indicating zero phase difference between the received signals, but it will be understood that similar hyperbolas define finite phase differences between the zero lines of phase. That is, as a craft progresses in the direction from transmitter 10 to transmitter 11, and assuming a straight line movement between these two stations, the phase difference between $S_1$ and $S_2$ will increase and then decrease in cyclical fashion between $A_1$ and $A_2$ as the craft progresses and at $A_2$, the phase difference will be zero. This process will repeat itself between $A_2$ and $A_3$, $A_3$ and $A_4$, etc.

Similarly, the progression of a craft between station 10 and station 12 may be determined by hyperbolic lines of phase such as represented by dotted lines $B_1$–$B_5$, which indicate zero phase difference for station 12. Thus, in order to determine the fix of the craft, it is necessary to know the phase difference between the signals $S_1$ and $S_2$ and the phase difference between signal $S_1$ and $S_3$ to determine intersecting lines of phase. It is also necessary to resolve the ambiguity by establishing the lane between zero lines of phase that the craft is moving in.

If, for example, it is known that the craft is in the lane $A_2$–$A_3$, the measured phase difference will establish a location of the craft on a hyperbola (i.e. line of phase) between $A_2$ and $A_3$. Similarly, by knowing the B lane and determining the phase difference between $S_1$ and $S_3$, the location of the craft on one of the B hyperbolas will be determined, and the intersection of the two hyperbols will provide an unambiguous fix of the craft's position.

It is assumed that the lines of phase the craft is between will be known either by other measurements or by counting each time the craft passes through a zero degree line of phase and keeping a record of the count of the lane crossings. This record can be maintained by suitable instruments or by an operator.

Referring now to FIG. 3, there is shown an illustrative Omega receiver of this invention, which receives signals from transmitters 10, 11, 12 at antenna 14 and applies the signals through conventional amplifier-limiter circuits 15 to a filter 16 which is tuned to the transmitted frequency. If the transmitted signals are modulated, then suitable demodulators can be employed in the front end of the receiver, as well understood by those skilled in the art.

The output from filter 16 is applied to correlator means 17, which multiplies the received signals by a locally generated reference signal of the same waveform and integrates their product to provide a D-C output signal proportional to the in-phase signal component of the received signal. Correlator means 17 is conventional such as a prior art balanced modulator with conventional integrating means (which may be a low pass filter).

The correlator is adapted to act separately and sequentially on the different input signals by means of a synchronization system which includes a synch motor 56, a radio frequency commutator 54, a gating commutator 28, and gate circuits 36, 38 and 40. The synch motor 56 is driven at speed equal to the switching frequency of the input signals. The commutator sections of RF commutator 54 are adapted to couple the output of a reference oscillator 50 to correlator means 17 during the time period when input signals are received. Commutator 54 comprises a fixed conductive element 57 which is permanently connected to input B as well as being connected to a stationary conductor 64. Conductor 64 connects to a rotating wiper arm 66, the rotation of which is controlled by synchronous motor 56, and commutator segments 58, 60 and 62 correspond in length to the time duration of the respective signals $S_1$, $S_2$ and $S_3$. That is, wiper arm 66 is in contact with commutator segment 58 when and so long as antenna 14 receives $S_1$, and in contact with commutator segment 60 when and so long as antenna 14 receives $S_2$ and so on. The commutator action of RF commutator 54 is synchronized with the incoming signals by means of a manual adjustment M which mechanically changes the angular orientation between the fixed contacts and movable contact of commutator 54. Other means of synchronizing the commutator action are known to the art and are not part of this invention. Synchronization can be determined by observing the readouts of the receiver while simultaneously adjusting the manual synchronization control, until consistent readouts are received which match the known position of the vessel. Synch motor 56 can be driven by any stable A-C voltage, but a stable drive voltage can be conveniently obtained from reference oscillator 50 by means of a frequency divider F. Reference oscillator 50, of course, is tuned to the same frequency as the incoming signals. As will be explained later, any frequency shift of oscillator 50 will be automatically corrected.

With commutator 54 properly set by manual adjustment M, input B of correlator 17 will receive reference signals in the same time period as the incoming signals $S_1$, $S_2$ and $S_3$ at input A. Correlator 17 produces a D-C signal output which is proportional to the product of the in-phase signal components in its received signal and generates no D-C due to noise or quadrature components in its input signals. For zero output, the correlator inputs A and B must be 90° out of phase, i.e. they must be in phase quadrature. Therefore, when the input signals A and B applied to the correlator are out of phase quadrature, a plus or a minus signal will result from the correlation process. Depending upon whether the output is positive or negative, bipolar relay means 20 produces a signal on one of two output leads 26 and 27. The bipolar relay means can be a double throw relay, switch, or semiconductor equivalent which selectably produces one of two possible control signals depending on the polarity of the input voltage; however, other control arrangements to produce the same result will be apparent to those skilled in the art.

The signals on output leads 26 and 27 are applied to reversible motors 22, 32 and 42 respectively, each of which may rotate in either direction depending upon the state of the bipolar means 20. Before any of the motors 22, 32 and 42 can operate, however, a gating control commutator 28 must provide enabling signals over leads 74, 76 or 78 respectively, to open gating circuits 36, 38 and 40 which are respectively connected to motors 22, 32 and 42.

Thus, if there is a signal on lead 26, reversible motor 22 will rotate in a positive direction only when there is also a concurrent signal on lead 74. In this case there will be no signal on leads 76 and 78, and gating circuits 38 and 40 will therefore be closed. There cannot be concurrent signals over more than one of the leads 74, 76, 78 because contact arm 30 of commutator 28 is selectively coupled to such leads in time sequence in synchronism with the action of RF commutator 54. From the arrangement of the commutator sections it will be apparent to those skilled in the art that reversible motor 42 is enabled when the input signal $S_1$ is being received and that reversible motors 32 and 22 are enabled when the signals $S_2$ and $S_3$ are received.

If the transmitted signal $S_1$ and the signal from reference oscillator 50 are in phase quadrature, the output from correlator means 17 will be zero when $S_1$ is being received, and bipolar means 20 will not cause reversible motor 42 to turn. If, however, the signals are out of phase quadrature, then, depending on the relative phase, the signal on lead 26 or 27 will pass through gate circuit 40 during the appropriate time interval to cause reversible motor 42 to vary phase shifter 52 until the reference signal on lead 80 is synchronized in phase quadrature with the incoming signal $S_1$.

The reference signal on lead 80 is applied via phase shifters 24 and 34 to commutator sections 60 and 62 of RF commutator 54 as well as to the frequency divider F. To determine the phase between $S_1$ and $S_2$, it will be noted that at the time that $S_2$ is received, wiper arm 66 will be in contact with commutator segment 60 and wiper arm 30 will contact segment 37 of the gating commutator. The reference oscillator signal which appears on lead 80 is applied over branch 81 to the phase shifter 34, then over to commutator segment 60, over wiper 66, fixed segment 57 to the input B of correlator means 17. If the inputs at A and B are not in phase quadrature, the output from correlator means 17 will operate bipolar means 20 and reversible motor 32 to produce a continuous variation of phase shifter 34 during the discrete receiving interval until the output from correlator 17 is zero. However, when any change is introduced by the phase shifter 34, it is immediately indicated and may be recorded by phase motor 72 which is utilized to provide the operator's indication of the relative position of the craft on one set of lines of phase.

Counter 96 is used to indicate the number of times that the phase member 72 goes through its zero position, which indicates the lane that the craft occupies between zero lines of phase curves. By a similar process, the phase difference between $S_1$ and $S_3$ is indicated on phase meter 70 and the corresponding lane count is indicated on counter 94. The operator then has all the information required to establish a fix on a chart such as illustrated in FIGURE 1.

It will be apparent to those skilled in the art that the output of the balanced modulator comprises a D-C signal plus a number of sidebands when the two input signals are out of phase by more or less than 90°. The conventional integrating means constituting part of a correlator responds to the short term sum of the output from the balanced modulator. However, a relatively longer term average is achieved in this invention by the use of reversible motors which turn in response to the output from the balanced modulator. Inasmuch as very long integration times are employed, in the order of two minutes, integration which previously was a difficult problem is performed by driving the constant speed reversing motors 22, 32 forward or reverse in accordance with the fluctuating signals from the correlator selectably and in time sharing relationship. Essentially, therefore, the bipolar means provides the motor sensing information to drive the selected motor forward or reverse as the short term D-C output of the correlator changes sign.

The balanced modulator may have associated with it a filter to reject the unwanted sidebands as well as to provide a short term averaging. However, this long term averaging is obtained by the addition and subtraction provided by the shaft rotation of the reversible motors.

The integration which is now possible over a relatively long time period enhances the accuracy of the system and naturally maximizes the S/N.

A simple reversible clock motor 42 can provide the desired slow constant-speed reversible shaft motion which drives the phase shift means 52 (which may be a goniometer) to adjust the phase of the reference signal fed to the correlator.

Coupled to the shaft 42' of motor 42 is a frequency correction means which may comprise a worm gear drive, a 100/1 gear reducer or any other motion transformer which responds to the cumulative motion of shaft 42'. The motion transformer is connected such that any short term angular rotations of shaft 42' provide only a minute and insignificant change in the frequency of oscillator 50. If, however, oscillator 50 is not synchronized with the frequency of the transmitted signals, then shaft 42' will be constantly rotating because the phase between signals of differing frequencies is constantly varying. Thus, after a large number of rotations of shaft 42' which are communicated to oscillator 50 via the mechanical means 53, the minute changes in frequency oscillator 50 which are cumulative, now become significant. Thus when the change is significant, the variation in frequency of oscillator 50 varies such that the frequency of oscillator 50 becomes synchronized with the transmitted frequency.

Drifting phase of the reference oscillator 50 will be corrected by the goniometer 52, and drifting phase of the master transmitter signal will also introduce a phase correction via the rotation of the goniometer. However, frequency changes are corrected as a result of the response of oscillator 50 to long term rotations of shaft 42'.

In FIGURE 3a, there is shown an electrical circuit for adjusting the frequency of reference oscillator 50, although the worm gear drive contemplated for use as element 53 of FIGURE 3 is preferred. The circuit of FIGURE 3a is identical with that of FIGURE 3, except that in place of mechanical frequency correcting means 53, an integrator 55 is shown in FIGURE 3a which responds to the long term average output from the correlator. The output form integrator 55 varies the frequency of oscillator 50 in a manner to cause the long term average to be reduced. The input to integrator 55 is shown as coming from correlator means 17, but it could as well respond to the sum of the input signals to reversible motor 42.

It will be noted, however, that short term drifts of the reference oscillator will appear as a rotation of shaft 42' which correctively alters the phase shifter.

An alternate preferred embodiment of the receiver is shown in FIGURE 4. The sequences of the received signals are identical as described previously in connection which the receiver of FIG. 3. After passing through amplifier 15 and filter 16, the received signals $S_1$, $S_2$, $S_3$ are applied sequentially to commutator 150. This commutator operates similarly to the commutator 54 of FIGURE 3 and comprises conductive segments 151, 152 and 153 and a rotating wiper arm 154 to which the input signals are applied. The length of segments 151, 152, 153 and the rotational speed of arm 154 are adjusted so that the wiper arm 154 is in contact with the conductive segments during the time period equal to the length of the designated respective signals $S_1$, $S_2$ and $S_3$. The rotation of arm 154 is developed by synchronous motor 56 which operates as described in connection with FIGURE 3. Manual adjustment means, not shown, may be utilized to vary the initial setting of arm 154 and synchronize the commutator.

Shown at 156, 158 and 160, respectively, are correlator-goniometer means, each of which responds to a phase difference between respective signals $S_1$, $S_2$, $S_3$ and stored reference signals which are developed from the reference oscillator 50 in a manner described later. Each correlator-goniometer means correlates the input and reference signal and develops an output proportional to the phase lag which is in the form of a rotation of a shaft which in turn is utilized to provide the desired phase information.

Signal $S_1$ is applied to correlator-goniometer means 156 over a segment 151. The stored reference signal from which a phase difference comparison is made, is applied over conductor 161 and branch conductor 162. Similarly, signal $S_2$ is applied to correlator-goniometer means 158 from conductive segment 152 while the reference signal is applied over branch conductor 164. Finally, the signal $S_3$ is applied to correlator-goniometer means 160 from conductive segment 153 and a reference signal is applied over branch conductor 166.

Each correlator-goniometer means may be varied or preset so as to reflect a predetermined phase difference between any respective incoming signal and the signal from the reference oscillator 50 and thus, the phase shifters 24, 34, 52 of FIGURE 3 are not illustrated or used as separate elements. It will be apparent that the rotational setting of the goniometer-correlator means inherently provides a phase setting.

When the arriving signals $S_1$, $S_2$ and $S_3$ are out of phase with respective reference signals, D-C output signals appear on output conductors 178, 180 and 182, each of which is applied respectively to conductive segments 172, 174 and 176 of a second commutator 170. Commutator 170 has a rotating arm 184 which is synchronized with the rotation of arm 154 of commutator 150 and is controlled by suitable mechanical coupling from the synch motor 56. The widths of segments 172, 174 and 176 and the rotational speed of arm 184 are adjusted such that when wiper arm 154 is in contact with respective signals 151, 152 and 153, arm 184 is in contact with segments 172, 174 and 176.

Arm 184 applies the output signal over conductors 192 to a third commutator 190. An amplifier 193 may be inserted in the series path from conductor 192 to the rotating arm 194 of the commutator. Commutator 190 has conductive segments 196, 198 and 200 which are of similar dimensions and functions as the other segments defined above.

The output of correlator-goniometer means 156 is varied by a mechanical rotation of shaft 212 by reversible motor 202. The rotation of shaft 212 is an indication of a phase difference and may be indicated on any suitable phase meter as illustrated in FIGURE 3. Further, the number of rotations representing lane changes may be counted by counter 203 which is similar to the counter 96 of FIGURE 3. The details of phase indicating means and the counter means are not shown since the art is well acquainted with means which translate the rotation of a shaft into any preferred indicating form.

Reversible motor 202 responds to positive or negative signals which appear over conductor 208 which is connected to segment 196 to rotate shaft 212 clockwise or counterclockwise, as the case may be to alter the rotational setting of correlator-goniometer means 156.

Similarly, segment 198 is connected to conductor 210 which drives a reversible motor 204 to rotate shaft 214 which rotates the correlator-goniometer means 158. A counter 205 is coupled to the shaft of motor 204 for the same purpose as counter 203. Finally, segment 200 is connected to reversible motor 206 over conductor 212. Motor 206 has a shaft 216 which rotates the correlator-goniometer means 160.

If the frequencies of the incoming signal and the reference oscillator 50 are different, frequency correction means 53 will respond to the continuous rotation of shaft 212 to produce a variation in the oscillator frequency in the same manner as described in connection with the embodiment of FIGURE 3.

As noted previously, a prior art balanced modulator can be used for correlator means 17 in connection with the receiver of FIGURE 3, but for the receiver of FIGURE 4, one of the novel correlator-goniometer means disclosed in FIGURES 5–11 should be used.

The balanced modulators normally used for correlation have a severe problem with large bandwidth ratios because of the residual D-C unbalance generally observed in rectifier elements. The novel correlator-goniometer means of this invention, however, employs a photo-resistive element or cell which is a pure resistor having no polarization, whose resistance is controlled by the light intensity, and is not affected by the electrical voltages applied to its terminals. The use of such a correlator element, with a stored reference varying the light intensity and with the signal fed through the correlator element to an integrator circuit, permits both greater sensitivity and improved dynamic range over a conventional balanced modulator. In addition, this correlator circuit has a relatively high output which is sufficient to drive a relay or its semi-conductor equivalent directly without the need for D-C amplification.

FIGURE 5 shows a simple embodiment of the correlator in which four lamps A, B, C and D are mounted in quadrature relation in one end of a cylinder 100 and a pair of photoresistive devices or photocells X and Y are mounted in the other end of the cylinder generally facing in the direction of the lamps. The cylinder end 101 containing the photocells X and Y can be rotated about the axis 102 of the cylinder, so that the photocells X and Y can be positioned at any desired angle with respect to lamps A, B, C and D. In one form of circuit arrangement shown in FIGURE 6, lamps A, B, C, D are energized by bias sources 103 and 104 and the A-C reference voltage (which may be applied from conductor 160 of FIGURE 4). The photocells X and Y receive a balanced input from an A-C input signal whose phase angle is to be measured with respect to the A-C reference signal ($e_{ref}$), as shown in the schematic circuit diagram of FIGURE 7. The reference signal is a sinusoidal voltage obtained from a reference oscillator at the frequency of the input signal.

For purposes of illustration, let us assume that the input and reference frequencies are 10 cycles per second. At frequencies of 10 c.p.s. or less, the outputs of lamps A, B, C, D will vary or follow the instantaneous voltage applied. Thus, the output light beam from each lamp is of a sinusoidally varying intensity. In order to achieve low frequencies in the input signals, frequency converters (not shown) may be coupled to the inputs to which the received and reference signals are applied.

If the magnitude of the voltages from batteries 103 and 104 (FIG. 6) are represented by E, and if $\phi$ represents the phase angle between $e_{ref}$ and $e_s$ ($e_s$ appears as an input to correlator-goniometer means 156 and segment 151)

$$V_A = -E - e_{ref}(\sin wt + \phi)$$
$$V_C = -E + e_{ref}(\sin wt + \phi)$$
$$V_B = -E - e_{ref}(\sin wt + \phi + 90°)$$
$$V_D = -E + e_{ref}(\sin wt + \phi + 90°)$$

If $E = |e_{ref}|$ (which is preferred)

$$V_A = -E - E(\sin wt + \phi)$$
$$V_C = -E + E(\sin wt + \phi)$$
$$V_B = -E - E(\sin wt + \phi + 90°)$$
$$V_D = -E + E(\sin wt + \phi + 90°)$$

Since lamps A, B, C, D will vary in accordance with the A-C component, during any period, the lamps will reach their maximum intensities in the sequence A, B, C, D.

With the photocells in the position shown in FIGURE 5, photocell X is principally illuminated by lamp A, and photocell Y by lamp C, the device operates as a phase sensitive detector (balanced modulator). For example, if a received signal in phase with the reference signal is applied to the signal input of FIGURE 7, a positive D-C error signal will appear in the output. This is because the resistance of X is varying in accordance with the reference signal and the output at 178 represents a multiplication of the two signals $e_s$ and $e_{ref}$. It should be noted that, with the photocells positioned as shown in FIGURE 5, the illumination on photocell X is primarily from lamp A in phase with the reference, with a small amount of light from lamp C in opposing phase.

The illumination from lamps B and D is relatively insignificant because such lamps are further away and being equal and in opposing phase due to the operation of the 90° phase shifter 105 illustrated in FIG. 6, produce only a steady (D-C) illumination. If the equation of lamp brightness is not precisely sinusoidal, there may be a component at double frequency due to lamps B and D, but there will not be any component at the operating frequency. The illumination on photocell Y is, of course, principally due to lamp C.

If a received signal $e_s$ in the phase sin $[wt + 180°]$ is applied to the signal input of FIGURE 7, a negative D-C output will result. However, if a signal at 90° (or 270°) to the reference is applied, no D-C will be produced in the output if the photocells are in the position shown in FIGURE 5. It has been noted that if the resistance of photocell (photoresistor) X varies in phase with the received signal, a positive D-C error signal will appear on conductor 178. If the cylinder end 101 is rotated, photocell X becomes illuminated more by lamp B while photocell Y is illuminated more by lamp D. This tends to reduce the positive D-C signal developed across X while increasing the signal developed across Y. Initially, the signal developed across Y was 0 because the resistance variation of Y was 90° out of phase with that of the received signals (the multiplication of two signals out of phase by 90° is 0). As the signal across X equals Y, the output becomes 0. The assembly of FIGURES 5–7 is thus equivalent in function to the combination of a balanced modulator and a phase rotator or a combined correlator-goniometer.

FIGURES 8 and 9 illustrate an improved correlator-goniometer means, particularly an improved mechanical arrangement embodying the concepts of the correlator-goniometer means of FIGURES 5–7. This embodiment does not require slip-ring connections for the photocell elements which are rotatable with cylinder end 101 in FIGURE 5. This correlator-goniometer means comprises a rotatable cylinder 106 which is journaled within a stationary housing 107 by means of bearings 108 and which can be rotated by a servo motor 109 via gears 110. (As applied to FIGURE 4, motor 109 could be used for reversible motor 202.)

Lamps A, B, C and D are mounted in quadrature relation within housing 107, as indicated in FIGURES 8 and 9, and photocells X and Y are mounted in the open ends of cylinder 106. The photocells, however, do not revolve with cylinder 106. In the center of cylinder 106, a double mirror 111 is aligned at a 45° angle to the axis of the cylinder 106, which is made out of clear plastic or other light transmitting material. Mirror 111 is preferably in the form of an ellipse, but it can be in any suitable form that will fit inside cylinder 106. The reflecting surfaces of reflector 111 can be opaque white paint, or silver, or any other diffuse suitable reflecting surface. It will be obvious to those skilled in the art that light from lamps A, B, C and D will be reflected from reflector 111 to photocells X and Y and that the amount of illumination applied to each photocell by each lamp is continuously variable from zero to a maximum level depending on the angular position of cylinder 106. It will also be apparent that the rotation of cylinder 106 will have the same effect on the output of the photocells as the rotation of the photocells shown in FIGURE 5. The correlator shown in FIGURES 8 and 9 uses the same signal input and output circuits shown in FIGURES 6 and 7, and it operates in the same manner as the embodiment shown in FIGURE 4.

Figure 11:
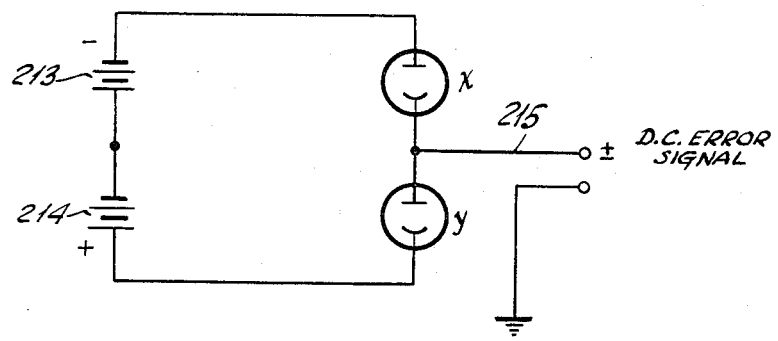

Another and preferred embodiment of the correlator-goniometer is shown in FIGURES 10–11. The mechanical mounting of lamps A, B, C, D and photocells X, Y may be as shown in FIGURES 4 or 7 and 8 and the previous description of these figures applies to this embodiment and will not be repeated. It will be observed that the arrangement of FIGURES 10–11 involve different circuit connections.

The average output light intensity from each lamp A, B, C, D of FIGURE 10 varies in accordance with the respective voltages applied thereto. However, in this case, frequencies higher than 10 c.p.s. are contemplated and the correlator operates on the average light intensities developed and received by the photocells. If any given received signal is assumed to have a phase lag $\phi$, the voltage equations across lamps A, B, C, D are:

$$V_A = \frac{e_s}{2} \sin(wt+\phi) - e_{ref} \sin wt$$

$$V_B = \frac{e_s}{2} \sin(wt+\phi) - e_{ref} \sin(wt+90°)$$

$$V_C = \frac{e_s}{2} \sin(wt+\phi) + e_{ref} \sin wt$$

$$V_D = \frac{e_s}{2} \sin(wt+\phi) + e_{ref} \sin(wt+90°)$$

the circuitry may be arranged such that the amplitudes of $e_s$ and $e_{ref}$ are relatively unimportant. In one case, $e_s/2$ may be set to equal $e_{ref}$, so that the equations become:

$$V_A = \sin(wt+\phi) - \sin wt$$

$$V_B = \sin(wt+\phi) - \sin(wt+90°)$$

$$V_C = \sin(wt+\phi) + \sin wt$$

$$V_D = \sin(wt+\phi) + \sin(wt+90°)$$

If $e_s$ and $e_{ref}$ are in phase, $\phi=0$ and:

$$V_A = 0$$

$$V_B = \sin wt - \cos wt$$

$$V_C = 2 \sin wt$$

$$V_D = \sin wt + \cos wt$$

As shown in FIGURE 10, the information signal $e_s$ is applied to the primary of transformer 200. The signal $e_s$ will be understood to be one of the received signals of unknown phase and that the other received signals are applied to respective correlator-goniometers of the same type as the embodiment. Lamps A, B, C, D as well as the 90° phase shifter 105 are connected as described in connection with FIGURE 6. Connected between a grounded center tap 203 of secondary 202 is the reference signal $e_{ref}$ which is applied to the input of 90° phase shifter 105 and at the common terminal of lamps A and C.

Lamps A, B, C, D produce an average or steady output at the frequencies of the applied signals. That is, the output of each lamp does not vary sinusoidally with the voltages thereacross.

As $\phi$ varies, the voltages $V_A$, $V_B$, $V_C$ and $V_D$ will vary to cause an imbalance of the resistance values of X and Y and a corrective voltage will appear at terminal 215 (FIGURE 11) which is applied to a motor (such as 202 of FIGURE 4 or 109 of FIGURE 9) to produce a corrective rotation of the combined correlator-goniometer.

The electrical connections of photoresistive elements X and Y are shown in FIGURE 11. Two D-C sources 213 and 214 are connected serially with the connecting terminal grounded. If the resistances of X and Y are equal, then the output at 215 will be 0 indicating a balance position. The resistances of X and Y will be equal when X is receiving most of its illumination from lamp D since the average voltage $V_B = V_D$ in the equations above when $\phi=0$. Thus, the balance condition requires a 90° rotation of the relative position of lamps and photocells as shown in FIGURE 5 to achieve the required 0 output at 215.

It will be understood that all of correlator-goniometers 156, 158 and 160 operate on the same principle as described in connection with FIGURES 5–11.

The reference oscillator 50, input filter 16, and amplifier-limiter circuit 15 can be any suitable very low frequency circuits. For example, the filter 16 can be a mechanical filter which uses short rods of Ni-Span C material as resonators with a response curve shaped to minimize ringing. This provides adequate narrowing and is reliably stable to a fraction of a cycle at 10.2 kc. In the reference oscillator, by using a magneto-striction rod resonator of Ni-Span C material in a temperature controlled oven in the feedback loop, it is possible to obtain the 10.2 kc. reference frequency with a long term accuracy better than one part in $10^6$ and a short term accuracy in the order of one part in $10^7$. Such oscillators have been used for some time in similar circuits and have proven uniformly good. Frequency correction is accomplished by varying a magnetic field in the rod element, which produces a microscopic change of a few microns in the length of the rod and thus changes its resonant frequency.

As mentioned earlier, the reversible motors 22, 32 and 42 can be simple clock motors, and the phase shifters 24, 34 and 52 can be goniometers or the like. Phase meters 70 and 72 can be any suitable means of indicating the angular displacement of the corresponding phase shifter shaft from its zero phase shift position, and counters 94 and 96 can be a conventional bidirectional or reversible revolution counter, such as a Veeder-Root counter which produces an output in accordance with the total angular rotations in one direction (less of course, the angular rotations in the reverse direction, which would occur when the direction of ship movement reverses relative to a transmitter location). Gate circuits 36, 38 and 40 can be diode or transistor gates or any other gating element which opens and closes in response to a voltage. Frequency divider F can be a tuned sinusoidal frequency divider or a binary frequency divider. Synch motor 56 can be any suitable synchronous motor which is adapted to be driven by the output of frequency divider F.

It should be noted that the complexity and cost of the Omega receiver depends to a large degree on how many functions must be performed automatically. Some functions can be performed automatically by simple circuits, but many would result in complicated and expensive equipment if performed automatically. In the receiver of this invention, the infrequently needed operations have been left for the operator to perform. These include the operations of obtaining proper time synchronization, changing from one set of stations to another, making corrections in the event of loss of time synchronization, and resetting the lane counters. This eliminates the circuit units which are idle most of the time from the receiver and provides the optimum apportionment of tasks between the receiver and the operator.

From the foregoing description it will be apparent that this invention provides a simple and effective Omega receiver which is low in cost and high in performance capabilities. And it should be understood that this invention is by no means limited to the specific embodiment disclosed herein, since many modifications can be made in the disclosed circuit without departing from the basic teaching of this patent application. For example, the manual synchronization adjustment M could be made by an adjustment of the synch motor 56 rather than by an adjustment of commutator 54 as shown. Also, the incoming signals could be converted to an intermediate frequency in the neighborhood of 35 cycles before being applied to correlator 17, and an automatic alarm circuit could be added to indicate loss of time synchronization. These and many other modifications will be apparent to those skilled in the art, and this invention includes all modifications falling within the scope of the following claims.

What is claimed is:

1. A method for determining the position of a craft by measuring the phase difference between pairs of synchronized low frequency signals of the same frequency produced at different time intervals by at least three fixed spaced apart transmitting stations, each station transmitting one signal, comprising
providing a reference signal at said frequency,
receiving each of said transmitted signals,
correlating a first of said received signals with said reference signal and varying the phase of said reference signal in accordance with the correlated output,
correlating each of said other signals respectively with said verified reference signal,
manually synchronizing said correlations with the reception of said transmitted signals,
providing a predetermined phase shift to said reference signal for each respective signal to correspond to the known initial time delay between said first signal and respective other signals and
varying said respective phase shifts in accordance with the respective correlated outputs to determine the actual phase difference between the received signals.

2. The method of claim 1 in which the actual phase difference between the received signals is determined by integrating the output of said correlating steps for discrete intervals over a relatively long time period.

3. The method of claim 1 in which said reference signal is provided by stabilizing the frequency of the local oscillator in response to long term output resulting from correlation with said first signal.

4. A receiver, for determining the position of a craft by measuring the phase difference between pairs of synchronized low frequency signals of the same frequency produced at different time intervals by at least three fixed spaced apart transmitting stations, each station transmitting one signal, comprising
a reference signal source at said frequency,
means receiving each of said transmitted signals,
means correlating a first of said received signals with said reference signal and varying the phase of said reference signal to that of said first received signal in accordance with the output of said correlating means output,
said correlating means also correlating the phase of each of said other signals respectively with the phase of said reference signal as varied to determine the phase difference therebetween,
means to provide a predetermined phase shift to said reference signal for each respective signal with which it is to be correlated, to correspond to the known initial time delay between the reception of said first signal and respective other signals, and bipolar means to produce a corrective signal to shift the phase of said reference signal in response to the output of said correlating means.

5. The receiver of claim 4 including integrating means to integrate said correlated signals for discrete intervals over a relatively long time period and counter indicator means to display the phase difference between the signals received from successive stations as a line of position, and to indicate the lane between zero phase shift lines in which the receiving craft is positioned.

6. The receiver of claim 4 including means to stabilize the frequency of said reference signal including means responsive to a long-term output resulting from correlation with said first signal to vary the frequency thereof.

7. A method for determining the position of a craft by measuring the phase difference between at least three synchronized low frequency signals of the same frequency and a reference signal of the same frequency, wherein said low-frequency signals are transmitted at different time intervals by at least three fixed spaced apart transmitting stations, each station transmitting one signal, comprising
providing a reference signal at said frequency, receiving each of said transmitted signals,
manually adjusting time sharing means such that each of said transmitted signals is correlated with said reference signal during the discrete time interval of its reception
correlating a first of said received signals with said reference signal during the discrete time interval that said first signal is received and adjusting the frequency of said reference signal in accordance with the correlated output,
correlating a second of said received signals with said reference signal during the discrete time interval that said second signal is received,
correlating a third of said received signals with said reference signal during the discrete time interval that said third signal is received,
determining from the output of the correlations between said first, second and third received signals and said reference signal the actual phase difference between said received signals, determining from said actual phase difference two lines of position.

8. The method of claim 7 in which the actual phase differences between received signals are determined by integrating the output of said correlation between said first, second and third received signals and said reference signal for discrete intervals over a relatively long time period.

9. A receiver for determining a fix of a moving object for use in conjunction with a navigational system in which a plurality of discrete, continuous low frequency waveforms are transmitted at different intervals, repetitively, from preselected different locations,
said receiver comprising
detecting means to detect said transmitted signals, means producing a waveform of the same frequency as said transmitted signals to provide a reference signal, correlating means coupled to the output of said detecting means to serially receive said signals at a first input, said correlating means including a plurality of phase shift means coupled to the output of said waveform means, and a plurality of reversible motors, each driving one of said plurality of phase shift means and connected thereto, respectively, through a time sharing gating means, first time sharing means coupling said reference signal selectably through respective phase shift means to apply such reference signal to other inputs of said correlating means at times synchronized with the receipt of a predetermined sequence of said discrete waveforms to compare said reference with respective detected signals, and time sharing gating means correlated with said first time sharing means to control the operation of respective reversing motors in accordance with said predetermined sequence of received signals.

10. The receiver of claim 9 in which said time sharing means and said time sharing gating means include commutators having segments correlated in length with the duration of said discrete waveforms, and synchronized driving means driving a rotating element of each commutator.

11. The combination defined in claim 9 wherein said time sharing gating means comprises a plurality of gating circuits coupled in parallel to the output of said correlator means, each of said gating circuits being coupled to the input of a corresponding reversible motor to apply the output of said correlator means thereto when said gating circuit is energized, and means for energizing said plurality of gating circuits in sequence at discrete time intervals synchronized with the time intervals at which respective low frequency signals are received.

12. The combination defined in claim 11 wherein said means for energizing said gating circuits comprises rotary switch means containing three stationary contact members and a rotatable contact member operable to make contact with each of said stationary contact members in sequence for an increment of time determined jointly by the dimensions of said contact members and the rotary speed of said rotatable contact member, energizing voltage source means coupled to said rotatable contact member, each of said stationary contact members being coupled to a corresponding one of said gating circuits, motor means coupled to the rotatable contact member of said rotary switch means, and means to drive said motor means to couple said energizing voltage in sequence to said gating circuits at discrete time intervals synchronized with the time intervals at which respective low frequency signals are received.

13. A receiver for determining the position of a craft such as a ship or plane by comparing phase differences between pairs of continuous low frequency signals of relatively few cycles duration produced respectively from at least three fixed spaced apart transmitters but at different times, said receiver comprising detecting means to detect said signals, indicator means to indicate the phase difference between said received signals and said reference signal, source means producing a reference signal of the same frequency as said continuous signals, correlating means including three separate electromechanical correlators comprised of rotative means mechanically linked to said indicating means to provide an effective phase adjustment between said input signals and said reference signal, and simultaneously drive said indicating means, coupling means including phase compensating means for applying said reference signal to said correlating means at discrete time intervals synchronized with the time intervals at which respective detected low frequency signals are received, means applying said detected signal to said correlating means, means to indicate the phase difference between said received signals and said reference signal.

14. A receiver for determining the position of a craft by measuring the phase difference between pairs of synchronized low frequency signals of the same frequency produced at different time intervals by at least three fixed, spaced apart transmitting stations, said receiver comprising input means for receiving said low frequency signals, a plurality of electromechanical correlating means having two inputs and an output and operable to produce an output signal indicative of the phase difference between signals applied to the inputs thereof, one input of said correlating means being coupled to said input means to receive said low frequency signals, reference oscillator means operable to produce a reference signal which comprises the other input to said correlator means, first commutator means operable selectively to apply said low-frequency signals to said correlating means at discrete time intervals synchronized with the time intervals at which respective low frequency signals are received, and means coupled to the output of said correlator means to indicate the phase difference between each of said low frequency signals and said reference signal, thereby indicating the position of said craft.

15. The combination defined in claim 14 in which said first commutator means includes at least three outputs and one input and means for sequentially coupling said outputs to said correlator means at discrete time intervals synchronized with the time intervals at which respective low frequency signals are received, said one input being coupled to the output of said receiver means, and said three outputs being coupled sequentially to the inputs of said plurality of correlator means, and means for adjusting the frequency of said reference signal to the frequency of said low frequency signals mechanically linked to the first of said correlator means.

16. The combination defined in claim 15 comprising second commutator means sequentially coupled to the output of each correlator means, said second commutator means having three inputs and one output and means for sequentially coupling said inputs to said output at discrete time intervals synchronized with the time intervals at which respective low frequency signals are received, and said three inputs being coupled to the output of said correlators, amplifier means the input to which is the output of said second commutator means, a third commutator means for sequentially coupling the output of said amplifier means to said means to indicate the phase difference between each of said low frequency signals and said reference signal.

17. The combination defined in claim 16 wherein said first, second and third commutator means each comprise rotary switch means containing three stationary contact members and a rotatable contact member operable to make contact with each of said stationary contact members in sequence for an increment of time determined jointly by the dimensions of said contact members and the rotary speed of said rotatable contact member,
motor means coupled to the rotatable contact member of both of said commutator means, and
means to drive said motor means to produce contact between said rotatable and stationary contact members at discrete time intervals synchronized with the time intervals at which respective low frequency signals are received.

18. The combination defined in claim 16 in which said means to indicate the phase difference between each of said low frequency signals and said reference signal is comprised of a plurality of reversible motors, one of said motors being driven by each output of said third commutator means and a phase difference indicator coupled to and driven by each of said reversible motors.

19. The combination defined in claim 14 in which said correlating means comprises
a plurality of light bulbs,
means to apply at least one of said two inputs to said light bulbs to selectively vary the illumination produced by each lamp in accordance with the phase of said one input signal,
a plurality of photoresponsive elements adapted to be illuminated by said light bulbs,
means to apply said other input to said photoresponsive elements,
said photoresponsive elements being connected together to produce an output signal indicative of the phase difference between said input signals,
and output means coupled to said photoresponsive elements to alter the relative position of said lamps to said photoresponsive elements.

20. The combination defined in claim 19 wherein four light bulbs are positioned in quadrature.

21. The combination defined in claim 20 and also including means for effectively rotating said light bulbs relative to said photoresponsive elements to effectively position said light bulbs opposite said photoresponsive elements.

22. The combination defined in claim 21 wherein said means for effectively rotating said light bulbs comprises a rotatable mirror communicating between said light bulbs and said photoresponsive elements.

23. Correlating means for producing an output signal indicative of the phase difference between two input signals, said correlating means comprising
a plurality of light bulbs,
means to apply one of said input signals to said light bulbs to vary the illumination produced thereby in accordance with the phase of said one input signal,
a plurality of photoresponsive elements whose resistance varies with illumination intensity adapted to be illuminated by said light bulbs,
means to apply said other input signal to said photoresponsive elements,
said photoresponsive elements being connected to produce an output signal indicative of the phase difference between said input signals,
and output means coupled to said photoresponsive elements.

24. The combination defined in claim 23 wherein four light bulbs are positioned in quadrature.

25. The combination defined in claim 24 and also including means for effectively rotating said light bulbs relative to said photoresponsive elements to effectively position said light bulbs opposite said photoresponsive elements.

26. The combination defined in claim 25 wherein said means for effectively rotating said light bulbs comprises a rotatable mirror communicating between said light bulbs and said photoresponsive elements.

27. Correlating means for producing an output signal indicative of the phase difference between two input signals comprising radiant energy means producing a radiating signal,
means to vary said radiating signal in accordance with the first of said input signals,
circuit means responsive to said radiating signal, a parameter of which varies in accordance with said radiating signal,
means to apply said other input signal in circuit electrically with said circuit means,
said radiant energy means being positioned relative to said circuit means so that variations of said relative position varies the parameter of said circuit means,
means responsive to the output from said circuit means to adjust said relative position, and thereby establish the phase difference of the two input signals.

28. Correlating means for producing an output signal indicative of the phase difference between two input signals comprising
a plurality of light sources,
circuit means to connect said light sources and including means to vary the light intensity of each of said sources in accordance with the first of said input signals,
light responsive means responsive to said light sources, a parameter of which varies in accordance with the incident light intensities of respective sources,
means to apply said other input signal in circuit electrically with said light responsive means,
said light source means being positioned relative to said light responsive means so that variation of relative position varies said parameter of said circuit means,
means responsive to an output from said light responsive means to control said relative position.

29. A receiver for determining the position of a craft such as a ship or airplane by comparing phase differences between pairs of continuous low-frequency signals of the same frequency and relatively few cycle duration, produced respectively from at least three fixed spaced apart transmitters at different predetermined time intervals, said receiver comprising,
means for detecting said low-frequency signals,
means for producing a reference signal of the same frequency as said low-frequency signals, and,
means for adjusting said reference signal to match the frequency of the received low-frequency signals, the improvement to which comprises,
a plurality of correlators for separately measuring the difference between the phase of each of said low-frequency signals and the constant phase of said reference signal, in which the phase of said reference signal remains constant throughout the measurement of the phase difference,
a plurality of indicator means linked to said correlators for displaying said phase differences as determined by each of said correlators, and a plurality of indicator means linked to said correlators for displaying the number of times said phase differences have progressed through zero.

30. The receiver of claim 29 wherein said reference frequency is adjusted to the precise frequency of said received signals by means mechanically linked to the first of said correlating means as the phase difference between the first of said received signals and said reference signal is determined.

31. The receiver of claim 29 wherein said plurality of correlator means is comprised of
a correlator for each low frequency signal received, and
photo responsive means within each such correlator rotatably responsive to the phase difference of the inputs thereto, including shaft means to transmit said rotatable response as a measure of said phase difference.

32. The receiver of claim 31 wherein the means for manually synchronizing the action of said correlating means with the sequential reception of their assigned low frequencies is comprised of commutator means for sequentially channeling said received low frequencies to said correlators during the discrete period of their reception, including a synchronous motor to drive said commutator means at a speed in relation to said reference frequency, and means to manually adjust the angular relationship of the moving member of said commutator with the stationary contacts therein such that said low frequencies are sequentially channeled to their assigned correlators in the order in which received.

33. The receiver of claim 31 wherein said indicator means for displaying said phase difference between said received low-frequency signals and said reference signal is comprised of a phase meter attached to the shaft means of said correlator means such that the rotary motion of said shaft is determinative of the indicated phase difference.

34. The receiver of claim 31 wherein the means for displaying the number of times the measured phase differences have progressed through zero is comprised of a counter linked to the shaft of said correlator means.

35. The method of claim 7 wherein the steps of correlating said first, second and third received signals with said reference signal and determining the actual phase difference therebetween comprises feeding each of said first, second and third received signals to the stationary element of separate rotatably sensitive electromechanical goniometers each comprised of a rotatable and a stationary element, feeding said reference signal into the rotatable element of each of said goniometers simultaneously with said feeding of the received signals, rotating the rotatable element of each of said goniometers until a null signal is received indicating phase quadrature between said received signals and said reference signal, measuring the degree of rotation required of each goniometer to obtain the null signals, determining from said measurement the actual phase differences between each of said received signals and said reference signal.

36. The method of claim 35 wherein the phase differences between each of said received signals and said reference signal is determined by measuring the degree of rotation of each rotatable element of said goniometer by mechanically coupling said rotatable element to rotational measurement means, determining the actual phase difference between each of said received signals and said reference signal by calibrating said rotational measurement means to translate the angular displacement measured into terms of time differential.

37. The receiver of claim 13 comprising means for adjusting the frequency of said reference signal to match the frequency of the first of said received signals, and wherein the rotative means of the first of said three electromechanical correlators is mechanically linked to said means, whereby said reference signal is adjusted to the frequency of said first received signal.

38. The receiver of claim 29 wherein each of said plurality of correlating means is comprised of a rotatably sensitive electromechanical goniometer comprised of a rotatable element and a stationary element, the input to said rotatable element is said reference signal, and the input to said stationary element is the low-frequency signals to be compared to said reference frequency.

39. The receiver of claim 38 wherein the rotatable element of each goniometer is mechanically linked to one of said plurality of means to indicate the phase difference between said reference and said low-frequency signals, and to one of said plurality of indicator means for displaying the number of times said phase difference has passed through zero.

References Cited
UNITED STATES PATENTS

| | | | |
|---|---|---|---|
| 2,193,789 | 3/1940 | Braselton | 250—205 |
| 2,595,552 | 5/1952 | Thomas | 250—220 |
| 2,768,374 | 10/1956 | Rust | 343—105 |
| 2,889,465 | 6/1959 | Buntenbach | 250—217 |
| 3,088,113 | 4/1963 | Rosenthal. | |
| 3,189,903 | 6/1965 | White | 343—105 |
| 3,209,356 | 9/1965 | Smith | 343—105 |
| 3,229,106 | 1/1966 | Lord et al. | 250—229 X |
| 2,838,753 | 6/1958 | O'Brien et al. | 343—105 |
| 3,263,231 | 7/1966 | Smith et al. | 343—100 |

OTHER REFERENCES

Pierce, J. A.: Technical Report on Radux, Office of Naval Research, Technical Report No. 17, July 11, 1947, 15 pages.

Backman, F. F., et al.: IBM Technical Disclosure Bulletin, "Signal Correlator," vol. 4, No. 3, August 1961, p. 92.

RODNEY D. BENNETT, *Primary Examiner.*

CHESTER L. JUSTUS, *Examiner.*

H. C. WAMSLEY, *Assistant Examiner.*